United States Patent [19]
Christie

[11] Patent Number: 5,130,891
[45] Date of Patent: Jul. 14, 1992

[54] DOCKING AMPLIFIER HOUSING ASSEMBLY

[75] Inventor: Cary L. Christie, Bell Canyon, Calif.

[73] Assignee: Infinity Systems, Inc., Chatsworth, Calif.

[21] Appl. No.: 635,886

[22] Filed: Jan. 2, 1991

[51] Int. Cl.$^5$ .............................................. H02B 1/10
[52] U.S. Cl. ...................... 361/391; 330/65; 361/392; 361/419; 455/347; 439/297
[58] Field of Search .................. 248/27.1; 330/63–69; 455/346, 347, 348, 349; 439/297, 298; 361/380, 390–395, 399, 413, 417, 419, 420, 346, 422, 338

[56] References Cited

U.S. PATENT DOCUMENTS

| | | | |
|---|---|---|---|
| 4,124,877 | 11/1978 | Vollenweider | 361/393 |
| 4,710,136 | 12/1987 | Suzuki | 439/374 |
| 4,931,907 | 6/1990 | Robinson | 361/391 |
| 4,972,296 | 11/1990 | Chu | 361/391 |
| 4,979,075 | 12/1990 | Murphy | 361/413 |

FOREIGN PATENT DOCUMENTS 7708208  7/1977  Netherlands ......................... 439/298

Primary Examiner—Gerald P. Tolin
Attorney, Agent, or Firm—Jones, Day, Reavis & Pogue

[57] ABSTRACT

An amplifier housing assembly particularly useful for automobile stereo systems is disclosed. The assembly comprises a mounting plate which bolts to a stationary surface and an amplifier enclosure which mounts on the mounting plate. Wires from speakers and a power source are connected to the mounting plate which are then connected to the amplifier when the amplifier housing is mounted on the mounting plate by means of male and female connectors. An antitheft feature of the housing is that the mounting bolts of the mounting plate are rendered inaccessible when amplifier enclosure is mounted on the mounting plate.

3 Claims, 3 Drawing Sheets

DOCKING AMPLIFIER HOUSING ASSEMBLY

BACKGROUND AND SUMMARY OF THE INVENTION

It is advantageous in automobile stereo systems to be able to easily remove the amplifier when it needs servicing. The present invention is a two-piece amplifier housing assembly which allows such removal. The housing assembly basically comprises an amplifier enclosure for containing the amplifier and a mounting plate which bolts to a stationary surface inside the car. Speaker and power wires connect to a connector mounted on the mounting plate. The mounting plate is designed so that the amplifier enclosure may be "docked" onto the mounting plate to thereby result in the electrical connection of the speaker and power wires to the amplifier. The mounting bolts of the mounting plate are also rendered inaccessible when the amplifier enclosure is docked onto the mounting plate which makes theft more difficult. A locking bolt having a non-standard head and requiring a special wrench is then used to secure the amplifier enclosure to the mounting plate.

Other objects, features, and advantages of the invention will become evident in light of the following detailed description considered in conjunction with the referenced drawings of a preferred exemplary embodiment according to the present invention.

DETAILED DESCRIPTION OF THE INVENTION

Figure 1:
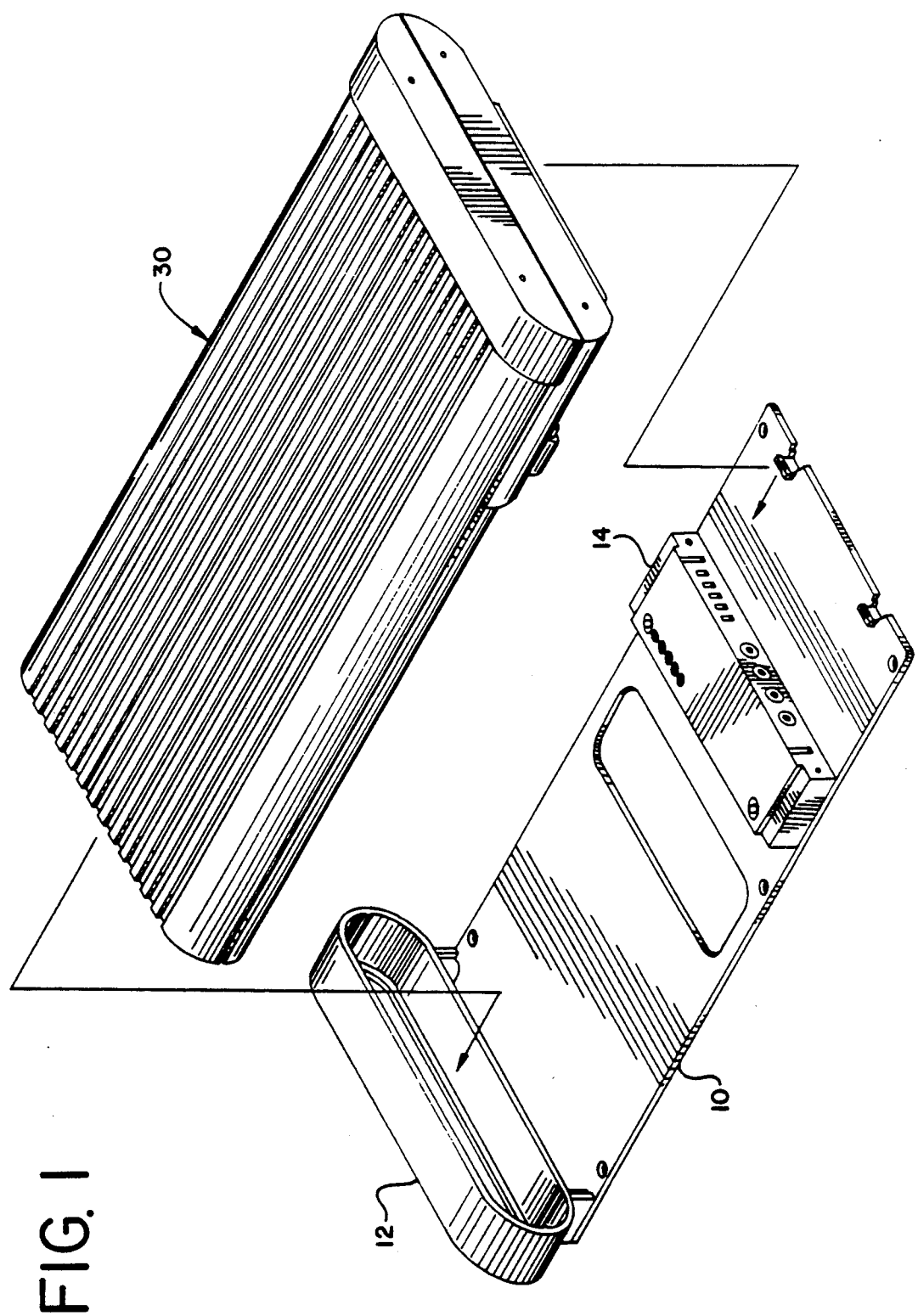
FIG. 1 shows how the amplifier enclosure is docked onto the mounting plate.

FIG. 1 shows the amplifier housing assembly which comprises two basic parts, an amplifier enclosure 30 and a mounting plate 10. The amplifier enclosure is secured in place onto the mounting plate by inserting one end of the enclosure into docking cap 12, referred to herein as "docking."

Figure 2:
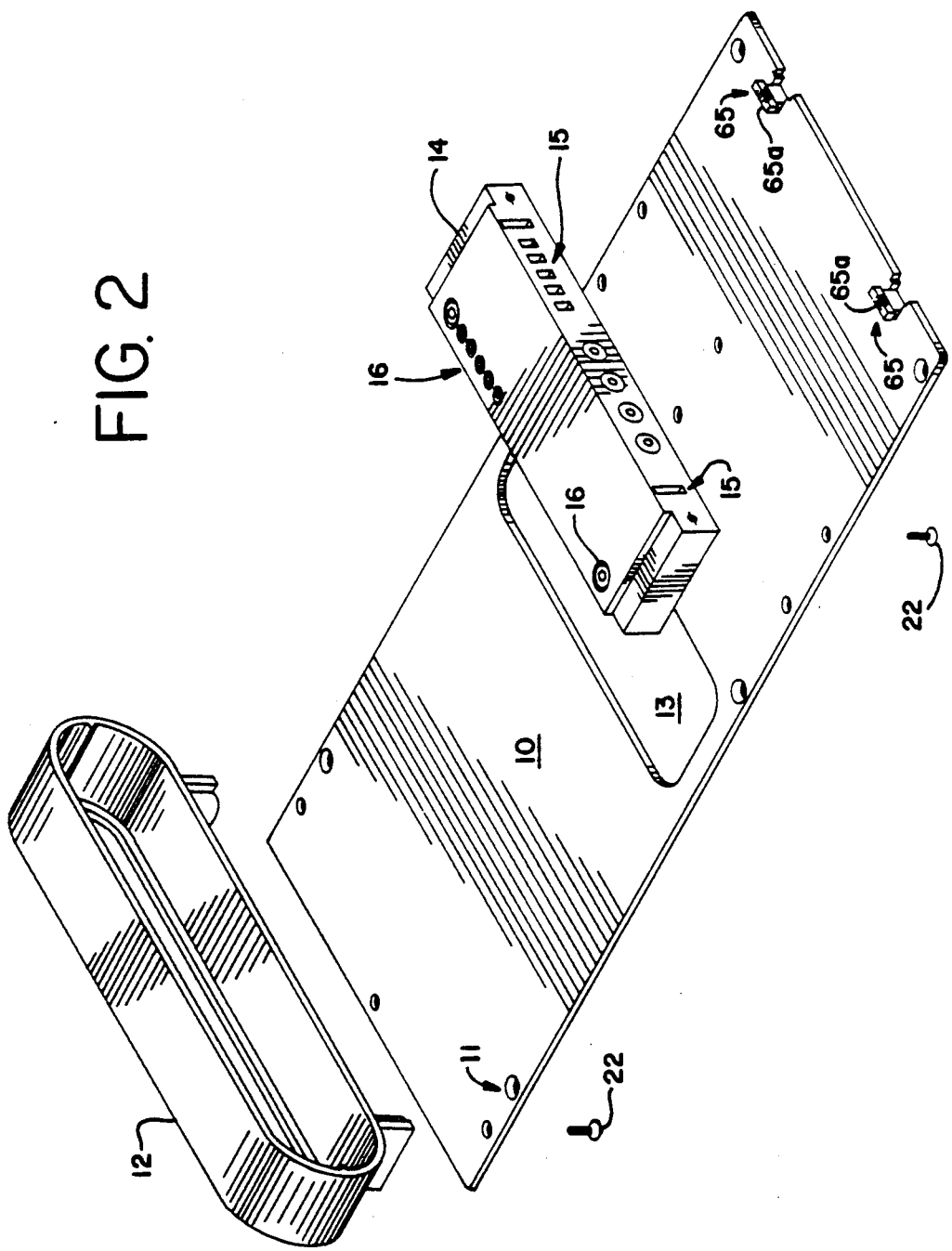
FIG. 2 is an exploded view of the mounting plate.

FIG. 2 shows the mounting plate 10 which may be mounted to a stationary surface by means of mounting bolts (not shown) inserted through mounting bolt holes 11. Mounted on the mounting plate 10 by means of screws 22 is a female connector block 14 having a plurality of terminals 16 to which may be connected speaker and power wires. The speaker and power wires may be brought to the female connector block 14 through an opening 13 in the mounting plate. Each of the terminals 16 is electrically continuous with a corresponding female connector socket 15. Docking cap 12 is mounted by means of screws (not numbered) at one end of the mounting plate.

Figure 3:
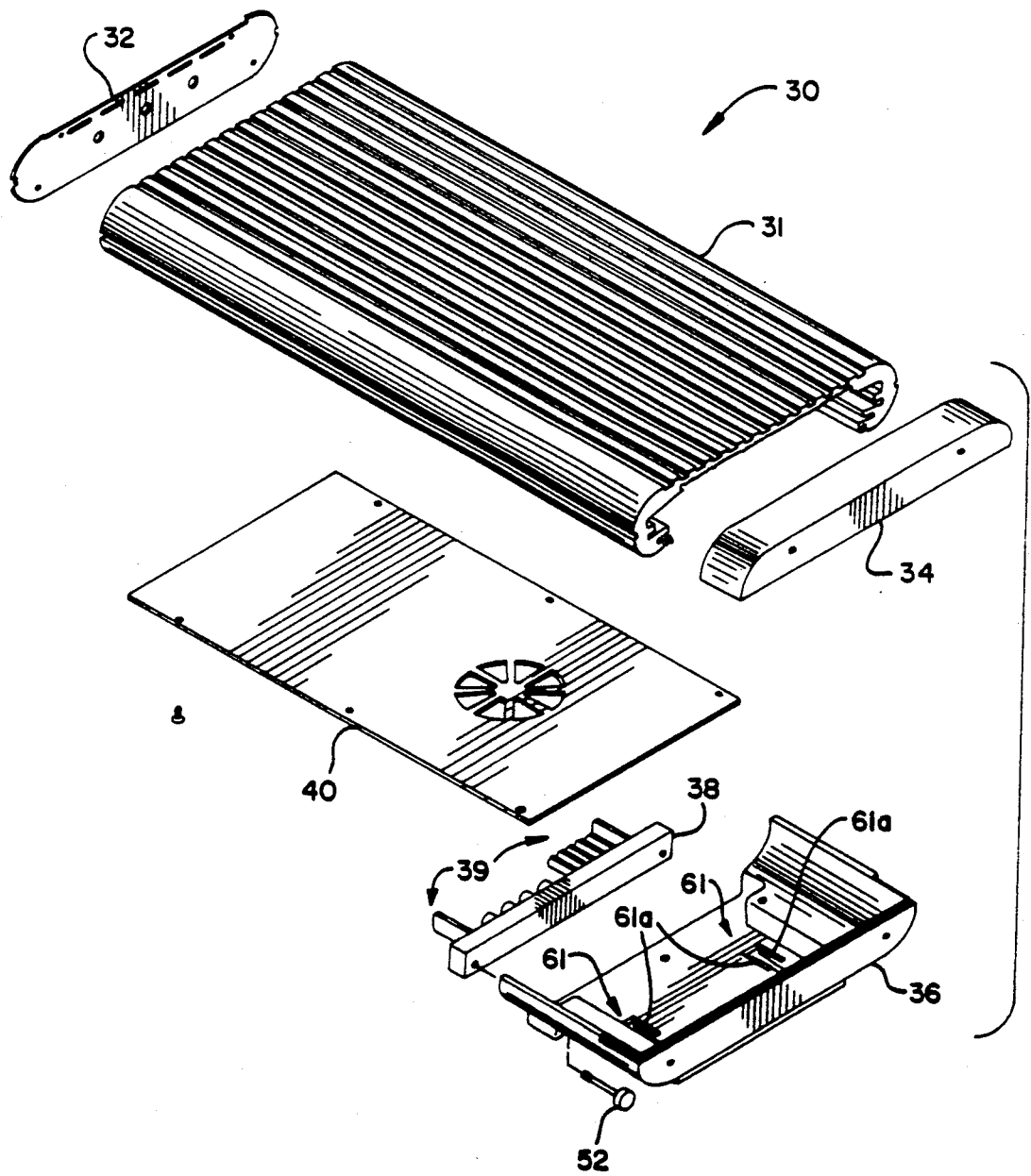
FIG. 3 is an exploded view of the amplifier enclosure.

FIG. 3 shows the amplifier enclosure 30. The enclosure comprises a shell 31 within which may be mounted the component parts of an amplifier. The bottom of the shell 31 is covered by a bottom plate 40 bolted to the shell 31. A control panel 32 for the amplifier is bolted at one end of the shell 31 while an end cap assembly comprising a top portion 34 and a bottom portion 36 is bolted to the other end. The bottom portion 36 has mounted therein a male connector block 38 which has terminals (not shown) to which may be connected the power input and speaker output ports of the amplifier. The male connector block 38 has prongs 39 which are each electrically continuous with a corresponding terminal. When the amplifier enclosure is docked onto the mounting plate, the prongs 39 engage socket 15 of the female connector block to thereby connect the amplifier to a power source and speakers.

As the amplifier enclosure is 30 is docked, tabs 65 of the mounting plate 10 insert through slots 61 of the bottom portion 36 of the end cap assembly. Tabs 65 each have an enlarged head 65a which extends laterally from the neck 65b. The heads 65a insert through the end portion of slots 61 nearest the docking cap 12. As the amplifier enclosure 30 is pushed into the docking cap, the tab heads 65a slide over ridges 61a of slot 61 which have a gradual upward slope. Ridges 61a thus are squeezed between the tab heads 65a and the mounting plate 10 as the amplifier enclosure 30 is pushed into the docking cap 12 which keeps the end cap assembly firmly in place on the mounting plate 10.

A locking bolt 52 having a non-standard head and requiring a special wrench may be employed to secure the amplifier enclosure to the mounting plate in the docked position. In the embodiment shown in FIG. 3, locking bolts 52 insert through holes in the end cap assembly bottom portion 36, male connector block 38, and female connector block 14. When the amplifier enclosure 30 is secured in this manner, the mounting bolt holes 11 are covered and rendered inaccessible which makes theft of the entire assembly more difficult.

Although the invention has been described in conjunction with the foregoing specific embodiment, many alternatives, variations, and modifications will be apparent to those of ordinary skill in the art. Those alternatives, variations, and modifications are intended to fall within the scope of the following appended claims.

What is claimed is:

1. An amplifier housing assembly, comprising:
   a flat mounting plate adapted to be mounted on a stationary surface, mounting bolts inserted through a plurality of mounting bolt holes in the plate;
   a docking cap mounted at one end of the mounting plate, the cap comprising a container with an opening facing toward the opposite end of the mounting plate;
   a female connector block mounted on the mounting plate having a plurality of sockets for receiving prongs from an amplifier;
   an amplifier enclosure with a male connector block mounted to the bottom thereof, the male connector block having a plurality of prongs inserted into the sockets of said female connector block wherein the male and female connector blocks are mounted such that the prongs of the male connector block engage the sockets of the female connector block with an end of the amplifier enclosure inserted into the opening of the docking cap;
   locking bolts securing the amplifier housing to the mounting plate by connecting the male connector block to the female connector block;
   a plurality of upwardly extending tabs affixed to the top of the mounting plate, each tab having a neck and an enlarged head extending laterally;
   a plurality of slots in the bottom of the amplifier enclosure through which are inserted the heads of the tabs of the mounting plate, each slot having a pair of inwardly extending ridges over which pass the tab heads as the amplifier enclosure is pushed toward the docking cap, the ridges having a gradual upward slope so as to be squeezed between the tab heads and the mounting plate and thereby firmly secure the amplifier enclosure to the mounting plate; and wherein the amplifier enclosure is held securely to the mounting plate by the docking cap, locking bolts and tabs, with the enclosure being of such size and shape so as to cover the mounting bolt holes and thereby render them inaccessible.

2. The amplifier housing assembly as set forth in claim 1 wherein the docking cap has an opening to allow access to an amplifier control panel located at one end of the amplifier enclosure when the enclosure is inserted therein.

3. The amplifier housing assembly as set forth in claim 1 wherein the mounting plate has an aperture through which may be passed wires for attaching to the terminals of the female connector block.

* * * * *